United States Patent
Liukkula

(10) Patent No.: US 9,849,731 B2
(45) Date of Patent: Dec. 26, 2017

(54) VEHICLE TIRE AND ANTI-SKID STUD

(71) Applicant: Nokian Renkaat Oyj, Nokia (FI)

(72) Inventor: Mikko Liukkula, Viiala (FI)

(73) Assignee: NOKIAN RENKAAT OYJ, Nokia (FI)

( * ) Notice: Subject to any disclaimer, the term of this patent is extended or adjusted under 35 U.S.C. 154(b) by 127 days.

(21) Appl. No.: 14/597,519

(22) Filed: Jan. 15, 2015

(65) Prior Publication Data

US 2015/0197122 A1    Jul. 16, 2015

(51) Int. Cl.
   *B60C 11/16*        (2006.01)

(52) U.S. Cl.
   CPC ................. *B60C 11/1675* (2013.01)

(58) Field of Classification Search
   CPC ................ B60C 11/16; B60C 11/1675
   USPC .......................................... 152/210
   See application file for complete search history.

(56) References Cited

U.S. PATENT DOCUMENTS

| | | | | |
|---|---|---|---|---|
| 3,741,270 A * | 6/1973 | Cantz | ............... | B60C 11/16 |
| | | | | 152/210 |
| 4,865,100 A * | 9/1989 | Linden | ............ | B60C 11/1643 |
| | | | | 152/210 |
| 2002/0050312 A1* | 5/2002 | Ostrovskis | ......... | B29D 30/66 |
| | | | | 152/208 |
| 2004/0231775 A1* | 11/2004 | Eromaki | .............. | B60C 11/12 |
| | | | | 152/210 |

FOREIGN PATENT DOCUMENTS

| | | | |
|---|---|---|---|
| CN | 101269613 A | * | 9/2008 |
| DE | 2640581 A1 | | 3/1978 |
| EP | 1637358 A1 | * | 3/2006 |
| EP | 1637358 A1 | | 3/2006 |
| EP | 2 540 527 A1 | | 1/2013 |
| FI | 7 8422 B | | 4/1989 |
| FI | 95112 B | | 9/1995 |
| JP | S56-4906 U | | 1/1981 |
| JP | 2013-133090 | | 7/2013 |
| RU | 2220056 C2 | * | 12/2003 |
| RU | 2292269 C2 | * | 1/2007 |

(Continued)

OTHER PUBLICATIONS

Machine translation for Russia 2,220,056 (no date).*

(Continued)

*Primary Examiner* — Steven D Maki
(74) *Attorney, Agent, or Firm* — Young & Thompson

(57) ABSTRACT

A vehicle tire including a tread intended for a rolling contact against a foundation, the tread having a tread pattern which includes circumferential and transverse grooves for removing water from a contact patch between the foundation and the tire, and anti-skid studs mounted in the tread and including a stud body and a hard metal pin secured thereto. An end of the metal pin, intended against a foundation, is formed as an inclined surface, whereby the metal pin has its end provided with the inclined surface acting on the foundation in an axial direction of the metal pin to a varying depth and the inclined surface being placed relative to a rotating direction of the tire in such an orientation that, as the tire is rolling freely forward, a leading edge of the hard metal pin to impinge first on the foundation is lower than a trailing edge.

11 Claims, 2 Drawing Sheets

(56) References Cited

FOREIGN PATENT DOCUMENTS

SE          524636 C2     9/2004

OTHER PUBLICATIONS

Derwent abstract for Russia 2,220,056 (no date).*
Machine translation for China 101269613 (no date).*
Machine translation for Russia 2,292,269 (no date).*
Machine translation for Japan 56-004906 U (no date).*
FI Search Report, dated Sep. 3, 2014, from corresponding FI application.

* cited by examiner

VEHICLE TIRE AND ANTI-SKID STUD

FIELD OF THE INVENTION

The invention relates to a vehicle tire, comprising a tread which is intended for a rolling contact against a foundation, said tread being formed with a tread pattern which comprises circumferential and transverse grooves for removing water from a contact patch between the foundation and the tire, as well as anti-skid studs mounted in the tread and comprising a stud body and a hard metal pin secured to the stud body.

The invention relates also to an anti-skid stud capable of being mounted on a vehicle tire for skid prevention, said anti-skid stud comprising a stud body and a hard metal pin secured to the stud body.

BACKGROUND OF THE INVENTION

In vehicle tire industry, it is prior known to provide winter tires, developed especially for snowy and icy foundations, with metal anti-skid studs for traction improvement. A purpose of the studs is to bite into the ice and to establish thereby a mechanical bond between the foundation and the tire for a brief moment that the stud is in contact with the foundation while the tire rolls across the discussed patch of foundation. The stud typically comprises a stud body constructed from light metal or the like and a pin made of hard metal, whereby it is actually just this hard metal pin which is intended for contact with the foundation.

The shape of an anti-skid stud has a major influence on how the anti-skid stud behaves on an icy or snowy foundation. Certain cross-sectional shapes are more effective than others in terms of digging into the ice and the stud orientation has also makes a considerable difference in the final result. Studded vehicle tires intended for road traffic service are subjected to very strict regulations, stipulating which type of studs and stud patterns are allowed for use in tires. Within these legally defined restrictions, the tire manufacturers are striving to develop solutions with as much traction as possible and as little road wear as possible.

SUMMARY OF THE INVENTION

An objective of the present invention is to further develop studded tires and traction characteristics thereof. One goal of the invention is to provide a novel type of anti-skid stud, featuring a hard metal pin shaped differently from those of the prior art. The purpose of this is for a lower-than-before stud force to enable the biting into ice and snow even more effectively than before. Another objective is to reduce the wear of a bare roadway with a suitable anti-skid stud design.

It is characteristic of a vehicle tire according to the invention that an end of the hard metal pin, which is intended against a foundation, is formed as an inclined surface, whereby the hard metal pin has its end provided with the inclined surface acting on the foundation in an axial direction of the hard metal pin to a varying depth and said inclined surface being placed relative to a rotating direction of the tire in such an orientation that, as the tire is rolling freely forward, a leading edge of the hard metal pin to impinge first on the foundation is lower than a trailing edge. In this context, being lower indicates that the leading edge of a hard metal pin is closer to the tire surface than the trailing edge of the hard metal pin, whereby, as a result of the rolling motion, the hard metal pin strikes the foundation with its inclined surface level therewith.

Respectively, it is characteristic of an anti-skid stud according to the invention that an end of the hard metal pin, which is intended against a foundation, comprises an inclined surface, whereby the hard metal pin has its end provided with the inclined surface acting on the foundation in an axial direction of the hard metal pin to a varying depth and said inclined surface being installable relative to the tire in such an orientation that a leading edge of the hard metal pin to impinge first on the foundation is lower than a trailing edge.

In the above-described manner, it is possible to achieve the objectives set for the invention. The inclined surface makes a contact "more softly" with the foundation, yet ensuring excellent traction in the course of rolling.

With an anti-skid stud according to the invention, it is also possible to make a difference in the tire regarding its braking grip/acceleration grip balance characteristic. When the vehicle is braking, the anti-skid stud has its higher trailing edge functioning as "a plow", which strives to dig particularly firmly into the surface. Thereby is also achieved a slight emphasis on improving the braking grip properties of a tire, while the acceleration grip is left relatively speaking slightly weaker. According to one embodiment, just some of the tire's anti-skid studs are of a presently discussed design and are orientated relative to the rotating direction as described. In this case, the other anti-skid studs of a tire can be for example different in design. This division into anti-skid studs of the invention and those of some other design can be conducted for example according to the laterally directed zones of a tire or as regarded appropriate in terms of tread blocks. For example, when it is desirable to emphasize the braking characteristic in cornering, the anti-skid studs present in the proximity of a tire's outer shoulder can be set as presently described and the anti-skid studs present elsewhere in lateral direction can be otherwise installed or have a different design. According to another embodiment, the tire has all its anti-skid studs installed as presently described.

It is characteristic of a vehicle tire and an anti-skid stud according to one embodiment that the hard metal pin has an inclination in axial direction of 0.1-0.4 mm in depth. It is further characteristic of a vehicle tire and an anti-skid stud according to still another embodiment that the hard metal pin has a cross-section which is a circle, oval, square, rectangle, lozenge, parallelogram, 5-gon, 6-gon, 7-gon, 8-gon, star-shaped consistently with the above, or the like.

BRIEF DESCRIPTION OF THE DRAWINGS

The invention and its embodiments will now be described in more detail with reference to the accompanying figures, in which figures.

DETAILED DESCRIPTION OF THE INVENTION

Figure 1:
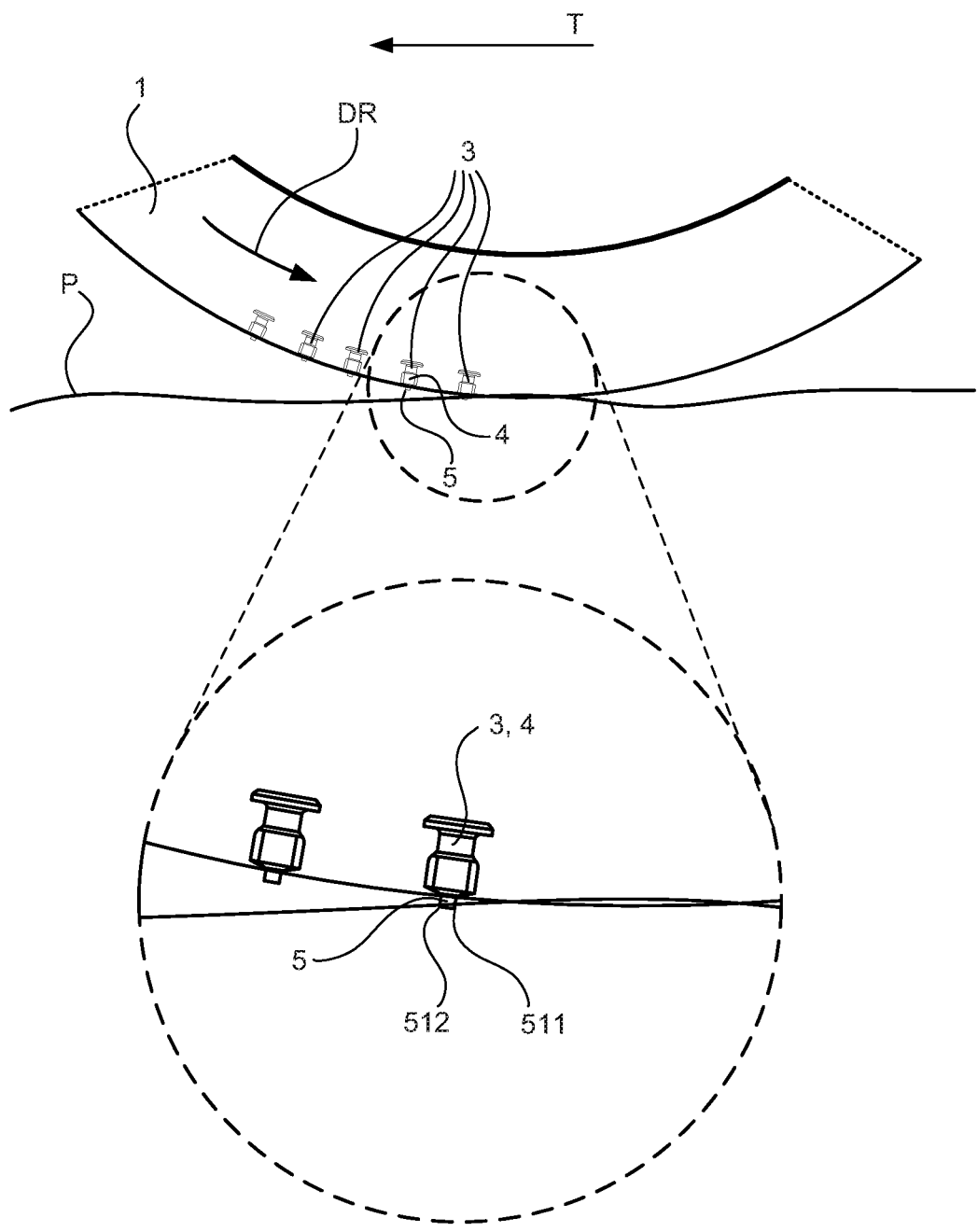
FIG. 1 shows a situation of the prior art regarding a vehicle tire and an anti-skid stud in the course of rolling.

FIG. 1 shows a situation of the prior art with a vehicle tire 1 rolling on a foundation P. In the course of rolling, the state of motion of a tire 1 is the combination of a rotation DR (around the tire's rotation axis) and a translation T (the path along a surface of the foundation P), the vehicle tire (more precisely a part of the tire) 1 being shown in FIG. 1 as rolling in the direction of a translation arrow T. In this context, the term free rolling refers to a situation that the vehicle is not braked or accelerated, i.e. there is no attempt to achieve a speed difference between the tire surface and the foundation in order to establish a change in the speed of said vehicle. In other words, FIG. 1 shows the vehicle tire 1, which comprises a tread intended for a rolling contact against the foundation P (said tread being formed with a tread pattern comprising circumferential and transverse grooves for removing water from a contact patch between the foundation and the tire—not shown in the figure), as well as anti-skid studs 3 mounted in the tread and comprising a stud body 4 and a hard metal pin 5 secured to the stud body. A lower part of the figure is an enlargement of the encircled portion, in which enlargement the impingement of a prior art anti-skid stud 3 upon the foundation P is perceivable. It is observable from the enlargement how the anti-skid stud 3 has a leading edge 511 of its hard metal pin 5 hitting the foundation P as rolling progresses. Hence, the leading edge 511 constitutes a tip that impinges on the foundation P. In principle, this "corner first" approach makes for a good engagement between tire and foundation, but the same effect may also cause foundation wear.

Figure 2:
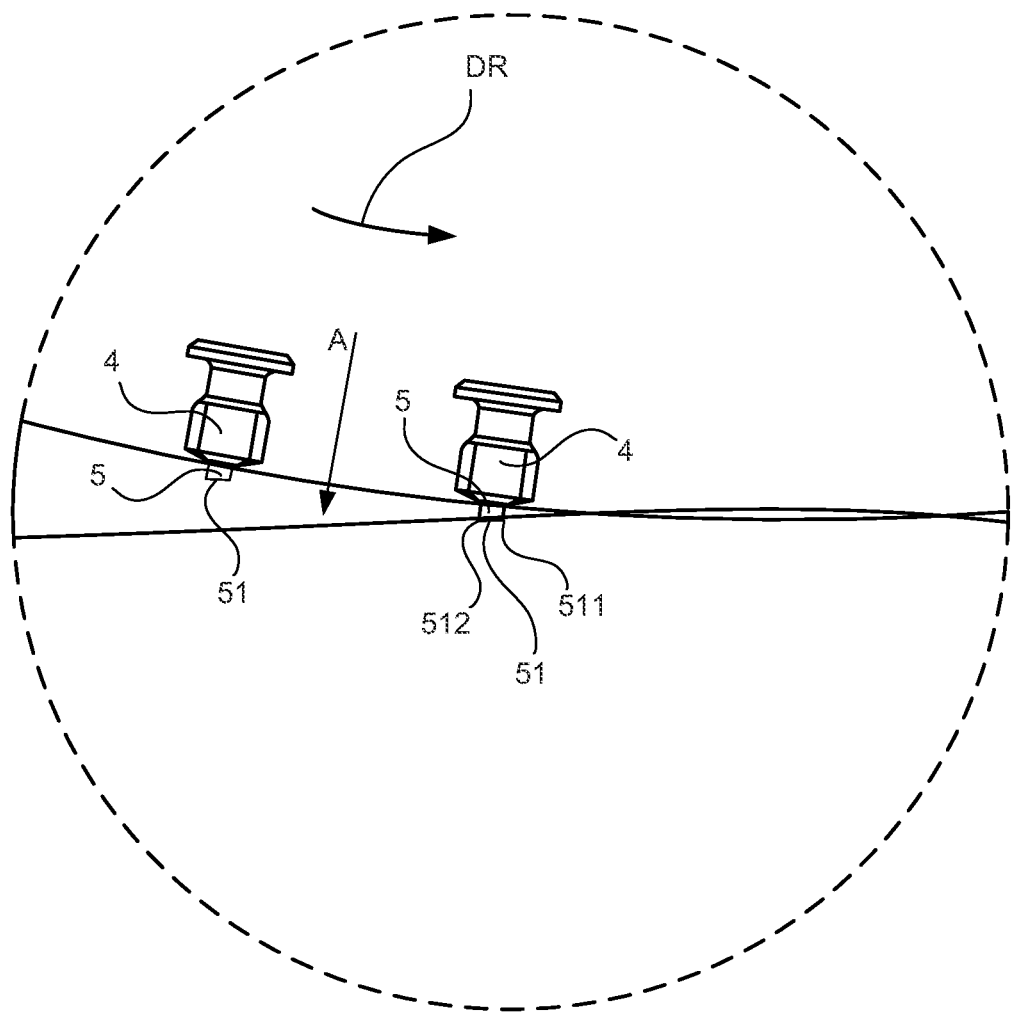
FIG. 2 shows a situation according to one embodiment of the invention regarding a vehicle tire and an anti-skid stud in the course of rolling.

FIG. 2 shows an enlargement similar to that in FIG. 1, but the anti-skid stud has now been replaced with an anti-skid stud 3 according to one embodiment of the present invention. Here, the end of a hard metal pin 5, which is intended against a foundation, is formed as an inclined surface 51, whereby the hard metal pin 5 has its end provided with the inclined surface 51 acting on the foundation in an axial direction A of the hard metal pin 5 to a varying depth and said inclined surface 51 being placed relative to a rotating direction DR of the tire in such an orientation that, as the tire is rolling freely forward, a leading edge 511 of the hard metal pin 5 to impinge first on the foundation is lower than a trailing edge 512. Hence, an axial direction of the hard metal pin 5 and a radial direction of the vehicle tire are more or less coinciding.

What is also apparent from FIG. 2 is how the end of a hard metal stud, intended against a foundation in the course of rolling, has been formed as the inclined surface 51 and how, as the hard metal pin 5 strikes upon the foundation P, that mentioned inclined surface 51 is more or less parallel to the foundation P. Thus, the inclined surface 51 hardly abrades the bare road surface, but on an icy or snowy surface the penetration force of the anti-skid stud 3 nevertheless achieves breaking of the ice and a momentary capture of the hard metal pin 5 in a recess formed in the ice, whereby the anti-skid stud generates a friction force between the tire 1 and the foundation P.

It is also notable from FIG. 2 that, when, in the course of braking, the rotational speed of a tire is reduced with respect to the speed of a foundation (peripheral speed of a tire<translation speed of a foundation), whereby, with some speed difference developing between the tire surface and the foundation, it is the trailing edge 512 of a hard metal pin which becomes an edge first to contact and engage the foundation. Hence, it is in fact the trailing edge 512 that becomes a sharp tip which is moving more slowly in comparison with the foundation and which bites particularly well into the foundation P.

Figure 3:
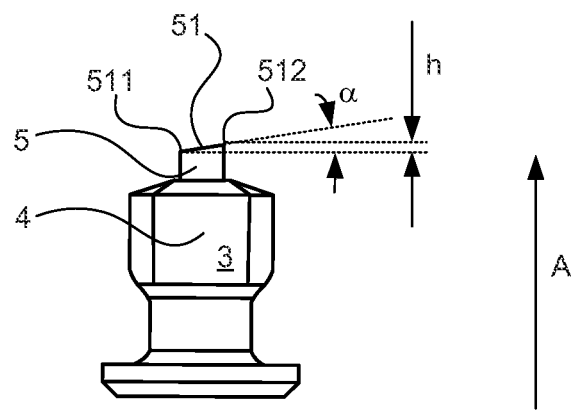
FIG. 3 shows an anti-skid stud according to one embodiment.

FIG. 3 shows, in a lateral view of the vehicle tire, one embodiment of the presently discussed anti-skid stud 3 capable of being installed in the vehicle tire as a skid prevention element, said anti-skid stud comprising a stud body 4 and a hard metal pin 5 secured to the stud body, whereby an end of the hard metal pin 5, which is intended against a foundation, comprises an inclined surface 51, the hard metal pin 5 having thereby its end provided with the inclined surface 51 acting on the foundation in an axial direction A of the hard metal pin 5 to a varying depth and said inclined surface 51 being installable relative to the tire in such an orientation that a leading edge 511 of the hard metal pin 5 to impinge first on the foundation is lower than a trailing edge 512. In terms of its depth h, the hard metal pin's inclination in axial direction is 0.1-0.4 mm. Thus, the surface lies at an angle $\alpha$ with respect to a plane perpendicular to the axial direction A. It is known from the prior art that a specific cross-sectional shape can be selected for the hard metal pin in view of emphasizing desired properties. Hence, the hard metal pin can have a cross-section in the shape of a circle, oval, square, rectangle, lozenge, parallelogram, 5-gon, 6-gon, 7-gon, 8-gon, star-shaped consistently with the above, or the like (not shown in the figures).

The invention and its various embodiments are not limited to the foregoing examples of implementations. The described individual features may occur in a solution of the invention regardless of other described individual features. The expressions included in the claims and reflecting the existence of characterizing features are open expressions in the sense that the presentation of characterizing features does not exclude from the solution such characterizing features which have not been presented in independent or dependent claims.

The invention claimed is:

1. A vehicle tire, comprising:
a tread which is intended for a rolling contact against a foundation,
said tread being formed with a tread pattern which comprises circumferential and transverse grooves for removing water from a contact patch between the foundation and the tire;
anti-skid studs mounted in the tread, each anti-skid stud comprising a stud body and a metal pin secured to the stud body,
wherein a first end of the metal pin, which is intended to impinge against the foundation, has an inclined surface with respect to a longitudinal axis of the metal pin, whereby the inclined surface of the first end of the metal pin acts on the foundation, in an axial direction of the metal pin, to a varying depth and said inclined surface being placed relative to a rotating direction of the tire in such an orientation that, as the tire is rolling freely forward, a leading edge of the inclined surface of the metal pin to impinge first on the foundation is lower than a trailing edge of the inclined surface of the metal pin, and
wherein the metal pin has a cross-section which is selected from a group consisting of oval, square, rectangle, lozenge, parallelogram, 5-gon, 6-gon, 7-gon, 8-gon, and star-shaped, and
the vehicle tire further comprises anti-skid studs without an inclined surface at an end intended to impinge against the foundation.

2. The vehicle tire according to claim 1, wherein a depth in the axial direction between the leading edge of the inclined surface of the metal pin and the trailing edge of the inclined surface of the metal pin is from 0.1 to 0.4 mm.

3. The vehicle tire according to claim 2, wherein the metal pin has a cross-section which is one of the group consisting of square, rectangle, lozenge, parallelogram, 5-gon, 6-gon, 7-gon, and 8-gon.

4. The vehicle tire according to claim 1, wherein the metal pin has a cross-section which is one of the group consisting of square, rectangle, lozenge, parallelogram, 5-gon, 6-gon, 7-gon, 8-gon, and star-shaped.

5. The vehicle tire according to claim 1, wherein the metal pin has a cross-section which is one of the group consisting of 5-gon, 7-gon, and star-shaped.

6. A vehicle tire, comprising a tread which is intended for a rolling contact against a foundation, said tread being formed with a tread pattern which comprises circumferential and transverse grooves for removing water from a contact patch between the foundation and the tire, as well as anti-skid studs mounted in the tread and comprising a stud body and a hard metal pin secured to the stud body, wherein a first end of the hard metal pin, which is intended to impinge against a foundation, is formed as an inclined surface, whereby the hard metal pin has first end provided with the inclined surface acting on the foundation in an axial direction of the hard metal pin to a varying depth and said inclined surface being placed relative to a rotating direction of the tire in such an orientation that, as the tire is rolling freely forward, a leading edge of the hard metal pin to impinge first on the foundation is lower than a trailing edge of the hard metal pin, and wherein the hard metal pin has a cross-section which is selected from a group consisting of oval, square, rectangle, lozenge, parallelogram, 5-gon, 6-gon, 7-gon, 8-gon, and star-shaped the vehicle tire further comprising anti-skid studs without an inclined surface at an end intended to impinge against the foundation.

7. The vehicle tire according to claim 6, wherein, a depth in the axial direction between the leading edge of the hard metal pin and the trailing edge of the hard metal pin is from 0.1 to 0.4 mm.

8. The vehicle tire of claim 6, wherein the cross-section of the hard metal pin is oval.

9. The vehicle tire of claim 6, wherein the cross-section of the hard metal pin is selected from the group consisting of square, rectangle, lozenge, parallelogram, 5-gon, 6-gon, 7-gon, 8-gon, and star-shaped.

10. The vehicle tire of claim 6, wherein the cross-section of the hard metal pin is selected from the group consisting of square, rectangle, lozenge, parallelogram, 5-gon, 6-gon, 7-gon, and 8-gon.

11. The vehicle tire of claim 6, wherein the cross-section of the hard metal pin is selected from the group consisting of 5-gon, 7-gon, and star-shaped.

* * * * *